Figure 1:
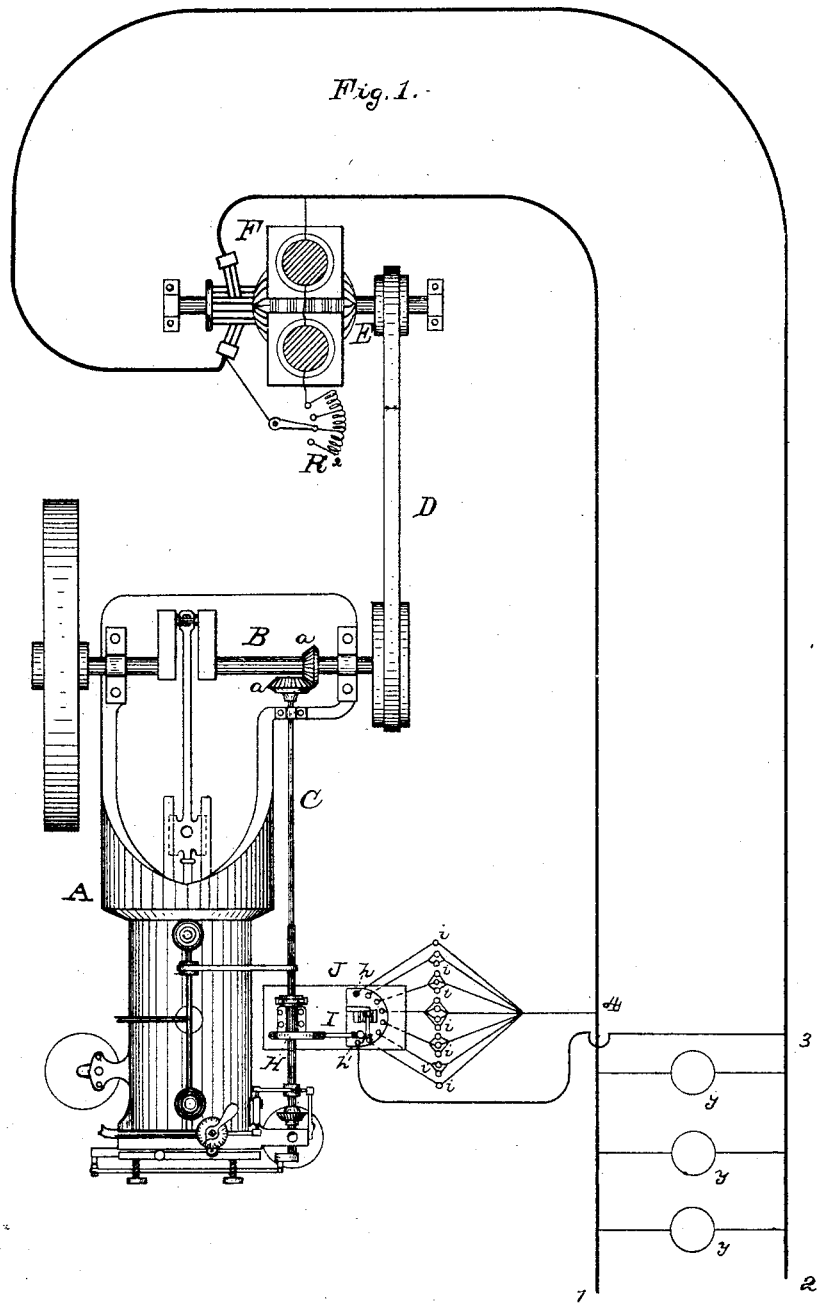

(No Model.) 4 Sheets—Sheet 1.

T. A. EDISON.
MEANS FOR OPERATING AND REGULATING ELECTRICAL GENERATORS.

No. 276,232. Patented Apr. 24, 1883.

ATTEST:
Edward C. Rowland
Henry W. Seely

INVENTOR
Thomas A. Edison,
By Rich'd N. Dyer,
Atty (No Model.)   T. A. EDISON.   4 Sheets—Sheet 2.
MEANS FOR OPERATING AND REGULATING ELECTRICAL GENERATORS.
No. 276,232.   Patented Apr. 24, 1883.
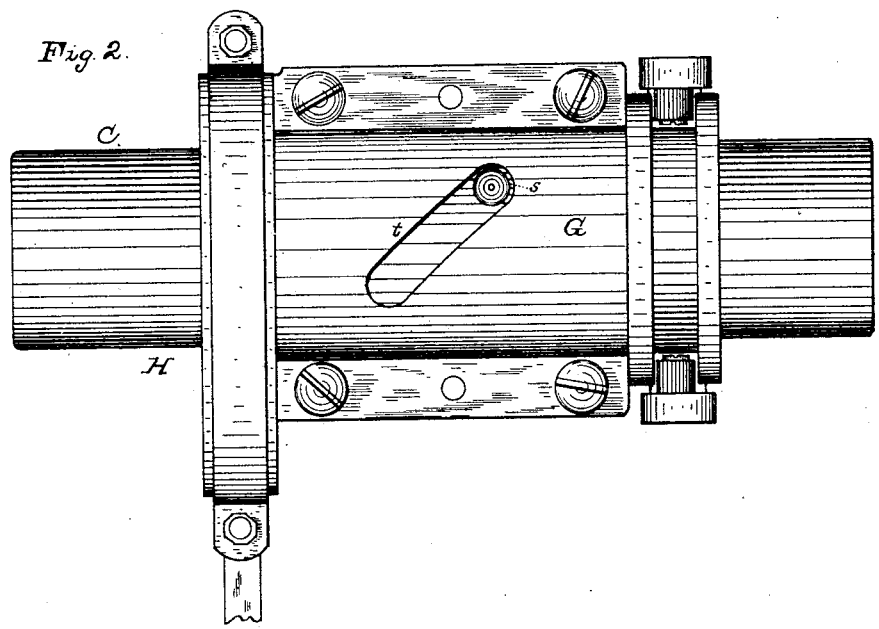
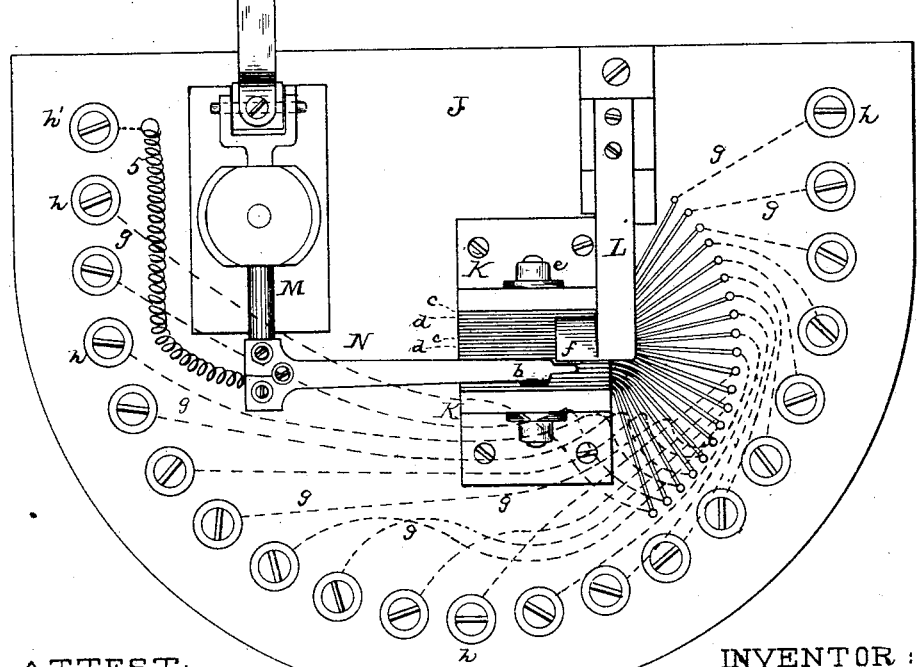

(No Model.)  4 Sheets—Sheet 3.

T. A. EDISON.
MEANS FOR OPERATING AND REGULATING ELECTRICAL GENERATORS.

No. 276,232. Patented Apr. 24, 1883.

ATTEST:
E. C. Rowlands
Henry W. Seely

INVENTOR:
Thomas A. Edison
By Rich'd N. Dyer,
Atty.

(No Model.) 4 Sheets—Sheet 4.
T. A. EDISON.
MEANS FOR OPERATING AND REGULATING ELECTRICAL GENERATORS.
No. 276,232. Patented Apr. 24, 1883.
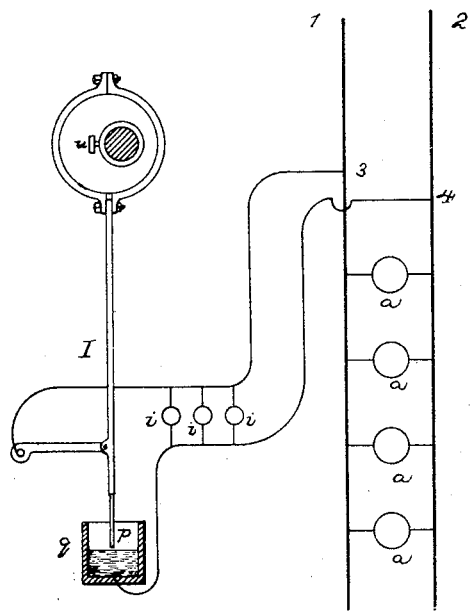
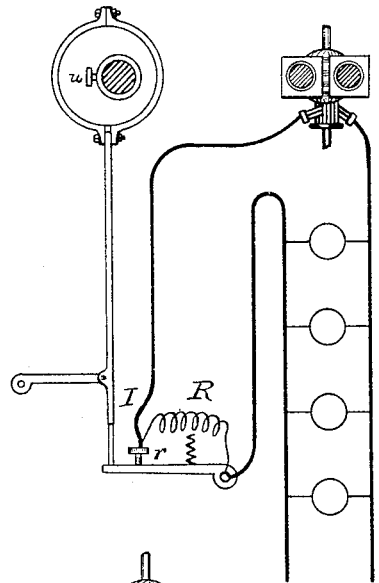
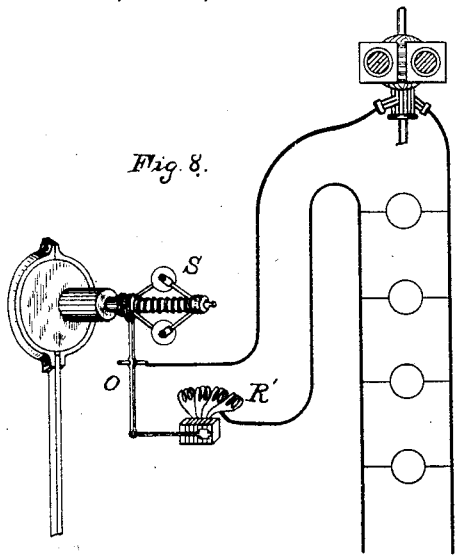
ATTEST:
Edw. C. Rowland
Henry W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

MEANS FOR OPERATING AND REGULATING ELECTRICAL GENERATORS.

SPECIFICATION forming part of Letters Patent No. 276,232, dated April 24, 1883.

Application filed January 8, 1883. (No model.)

*To all whom it may concern:*

Be it known that I, THOMAS A. EDISON, of Menlo Park, in the county of Middlesex and State of New Jersey, have invented a new and useful Improvement in Means for Operating Electrical Generators, (Case No. 532,) of which the following is a specification.

All attempts which have hitherto been made to produce electricity for illuminating and other purposes by employing engines actuated by explosions of gas to drive the rotating armatures of electrical generators have been practically unsuccessful, for the reason that when the explosion occurs the speed of the engine, and consequently that of the armature revolved thereby, is increased, causing an increase in the current generated, while between the explosions the speed gradually declines and the current is diminished. This variation in current of course produces improper effects in the translating devices supplied from the generator; and this is especially the case when the current is employed for incandescent electric lamps, the variations of current causing constant variations in the brilliancy of the lamps.

The object I have in view is to successfully employ gas-engines in operating electric generators which supply current to electric lamps, electro-motors, or other translating devices; and to this end my invention consists in employing, in connection with a gas-engine and the generator or generators driven thereby, means operated automatically by the movement of the apparatus, to compensate for the increase of speed by reducing the proportion of the entire current generated, which is transmitted to the translating devices, such means being caused to operate at the moment when the increase of speed commences, so that practically the same current is supplied to the translating devices as before.

I prefer to employ my invention in connection with a multiple-arc system of lighting by electrical incandescence, though it may be employed with a series system and with arc-lamps or any kind of translating devices.

The generator, which is preferably a dynamo-electric machine having its field and armature coils in multiple-arc relation to each other, but which may have its field energized from an external source, is connected preferably by a belt with the shaft of the gas-engine.

Lamps or other translating devices are placed in multiple arc across main conductors leading from the machine.

Where the "Otto" or other gas-engine is used, in which an explosion occurs at every second revolution of the fly-wheel, a cam or eccentric is placed on the shaft which operates the valves, which shaft revolves with one-half the speed of the main shaft, so that the explosion occurs once during each of its revolutions. This cam or eccentric works an arm whose movement causes a decrease in the proportion of the current generated, which is supplied to the translating devices at the moment of the explosion. Such diminution may be accomplished by throwing resistance into the main circuit; but it is preferable to diminish the proportion of current in the translating devices by closing other multiple-arc circuits, (through suitable resistance,) and thus providing new paths for the current. A number of such multiple-arc circuits, all of the same resistance, may be simultaneously thrown into circuit as soon as the increase of speed occurs; but in a gas-engine the speed gradually increases after the explosion up to a certain point, and then gradually declines. Therefore I prefer to close a circuit of high resistance at the beginning of the increase, and then successively close circuits of gradually-decreasing resistance in the proper proportion until the maximum speed is reached, when the resistances are gradually increased as the speed runs down. To accomplish this I prefer to employ as resistances a number of incandescing electric lamps. One terminal of the multiple-arc circuit from the main line is connected with the circuit-controlling arm worked by the eccentric, while the other terminal is divided into a number of branches, each running to a contact-point. In each of these branches is placed one or more of the resistance-lamps, they being, if more than one is used, in multiple-arc relation to each other, so that the branch containing most lamps is the one of least resistance. The lamps are so arranged that at the first slight increase of speed a circuit containing only one lamp will be closed by the movement of the circuit-controlling arm, while as the speed increases circuits containing two, three, or more lamps are successively closed. As the speed again declines circuits containing less numbers of lamps are closed until near the end of the first revolution. During the second revolution the decline in speed is so small and gradual that the generation of current is practically unaffected by it.

I prefer to use for opening and closing the multiple-arc branches a commutator, which consists of a number of thin metal plates set near together, but separated by plates of insulation. Each metal plate is extended out beyond the insulation and bent so that the plates diverge into a fan shape. Wires connected one to each plate run to binding-posts, from which the wires run which form the circuits including the resistance-lamps. A contact-point placed at the extremity of the circuit-controlling arm slides backward and forwark over the edges of the commutator-plates during each revolution of the valve-shaft; and a thin metal plate is so placed that it will lie between the contact-point and the commutator-plates during that half of the revolution of the valve-shaft during which no explosion occurs, while during the rest of the revolution the contact-point will pass under this plate and be in contact with the edges of the commutator-plates. Thus when the explosion occurs the contact-point, passing over the edges of the commutator-plates, will close the successive multiple-arc branches, while, when the eccentric draws such point back, it will be separated from the commutator-plates by the flat plate mentioned, and said branches are not affected.

As stated, it is preferable to vary the proportion of current supplied to the translating devices gradually. I may, however, accomplish such variation all at once, and this accomplishes the regulation in a very satisfactory manner, although not so perfectly as that just described. In this case the arm attached to the eccentric merely serves to close a circuit, which may be a multiple-arc circuit of the desired resistance, or may act as a shunt around a wire-resistance in the main line. The circuit-controller may be a point dipping into a mercury-cup, and withdrawn therefrom as the arm is moved back and forth; or the circuit may be made and broken at contact-points in any ordinary manner. With all these arrangements means are provided for adjusting the position of the eccentric so that it can be set to act at the proper point.

It is evident that the eccentric might be placed on the main shaft of the engine, on the shaft of the armature, or on any moving part of the apparatus, proper adjustment of the eccentric being made to insure its action at the proper point.

In some gas-engines the air and gas are admitted to the exploding-chamber at such times and in such proportions that the explosions occur irregularly instead of at every other revolution. With such engines an arrangement different from those described is necessary. Such arrangement consists of a spring-governor placed on the valve-shaft or any rotating portion of the engine or generator, and provided with an arm for varying a resistance placed preferably in one of the main conductors. I preferably employ the flat commutator-plates described, with wires running from them and including resistance-coils. As the speed of the engine increases upon the occurrence of an explosion, the movement of the governor throws the resistance-coils into circuit, while, as the speed declines, the contact-arm is drawn back and throws out resistance.

Figure 3:
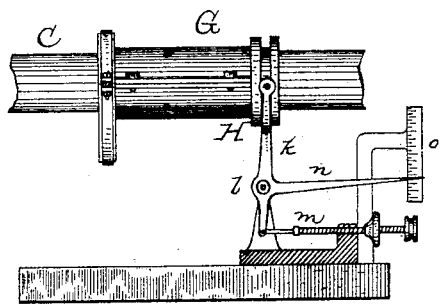
Figure 4:
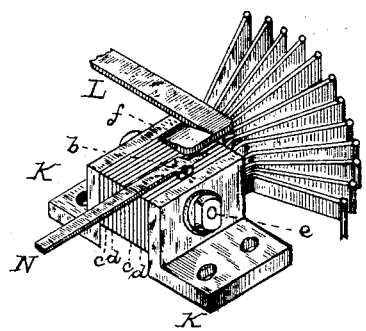
Figure 5:
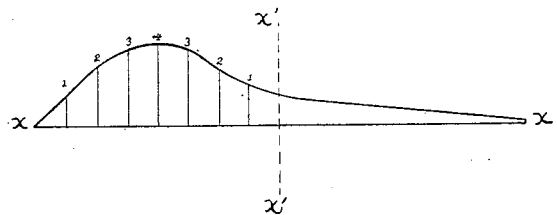

In the accompanying drawings, Figure 1 is a top view, representing a gas-engine, the generator driven thereby, and the compensating devices; Fig. 2, a top view of the eccentric on the valve-shaft and the resistance-commutator; Fig. 3, an elevation illustrating the devices for adjusting the eccentric; Fig. 4, a detail view, in perspective, of the resistance-commutator; Fig. 5, a diagram illustrating the variation in speed of the gas-engine and the times at which the resistance-lamps should be placed in circuit; and Figs. 6, 7, and 8 are diagrams illustrating other forms of the invention.

Referring to the first five figures of the drawings, A represents a gas-engine, B the main shaft of the same, and C the shaft which operates the valves, and is revolved from shaft B by gears $a\,a$, the shaft C making half as many revolutions as the shaft B. A belt, D, runs from shaft B to the armature-shaft E of a dynamo-electric machine, F. From the generator F main conductors 1 2 extend, across which translating devices $y\,y$ are placed in multiple-arc circuits.

Upon a sleeve, G, on shaft C is mounted an eccentric, H. From the eccentric H runs a rod, I, which terminates in a contact-point, $b$.

Upon a suitable insulating-base, J, are supported edgewise and side by side the series of thin metal plates $c\,c$, separated by plates $d\,d$, of mica or other insulating material, the whole being supported and held together by an insulated bolt, $e$, passing through the plates and the standards K K. Supported also from the base J is the flat spring-piece L, which terminates in an inclined plane, $f$, located immediately above the edges of the commutator-plates $c\,c$.

The rod I, which is attached to the eccentric, is connected with rod M, and to rod M is attached at right angles the contact-arm N, which terminates in a point, $b$, resting on the commutator-plates $c\,c$. Each commutator-plate extends out beyond the insulating-plates and is bent out from the rest, the whole forming a fan shape, and to each is attached a wire, $g$, passing under the base J, each wire $g$ being connected with one of the binding posts $h$. The wire 3 of a multiple-arc circuit, 3 4, from the main conductors 1 2 is connected to a binding-post, $h'$, on the base J, from which a wire, 5, runs to arm N. The wire 4 is divided into a number of branches, as seen in Fig. 1, each connected with one of the binding-posts $h$. Each of these branches contains one or more resistance-lamps, $i$, in multiple-arc relation to each other, as shown.

The operation of these devices is as follows: The explosion occurring, as stated, once during each revolution of the valve-shaft C, the eccentric is so adjusted that at the time of the explosion the contact $b$ is in the position shown in Figs. 2 and 4. The motion of the eccentric draws the contact-point along the plates $c$ $c$, under the piece $f$, making successive contacts and throwing into circuit first one, then two, three, and four lamps, as the speed increases, and then gradually reducing the number as the speed declines. This is clearly illustrated in Fig. 5, wherein the curve $x$ $x$ shows the increase and decrease of speed during two revolutions of the main shaft and fly-wheel, or one revolution of the valve-shaft, the dotted lines $x'$ $x'$ showing the end of the first revolution. The full vertical lines represent the points at which lamps are thrown in, the figures showing the number of lamps at each point. The decline in speed during the second revolution is so small and gradual that it is not necessary to compensate for it. It is evident that the circuit 3 4 may be divided into many more parts and lamps thrown in with much greater frequency; that more lamps may be used, if necessary, at points of greatest speed, and that at points of less speed, where a high compensating resistance is desired in the circuit, higher resistance lamps may be used, or two or more lamps in series may be thrown in. During the second half of the revolution of the valve-shaft the contact $b$ slides forward, but now passes over the inclined plane $f$, and is thus kept from contact with the commutator-plates. It then drops into the position shown in Figs. 2 and 4 in time for the explosion.

The sleeve G, which carries the eccentric H, is made adjustable on shaft C by means of a forked arm, $k$, attached to said sleeve, pivoted at $l$, and moved by screwing in and out the rod $m$, a pin, $s$, on the shaft moving in a slot, $t$, so that the movement of the sleeve adjusts the eccentric. A pointer, $n$, is attached to arm $k$, moving on a scale, $o$, by which the position of the eccentric is determined. This adjustment is desirable in order that the eccentric may be made to act at precisely the proper points.

In Fig. 6, a number of resistance-lamps $i$ are in multiple arc across the circuit 3 4. The arm I terminates in a contact-point, $p$, which enters a mercury-cup, $q$, and completes the circuit 3 4 at the moment when the explosion occurs, thus throwing the lamps $i$ $i$ into circuit and reducing the proportion of current supplied to the translating devices $a$ $a$.

It is evident that the eccentric which moves the rod I may be attached to any revolving part of the apparatus. In Fig. 7 the motion of the arm I opens and closes circuit at $r$, thus throwing a resistance, R, into the main circuit when the speed increases, and closing a shunt around the resistance when the speed diminishes. In Figs. 6 and 7 the eccentric is adjusted by means of a set-screw, $u$.

The device illustrated in Fig. 8 is intended for use with gas-engines in which the explosive gaseous mixture is not regulated so as to explode at stated regular intervals, but explodes irregularly. A spring-governor, S, is placed on the main shaft or valve-shaft of the engine or on any other revolving part of the apparatus, and an arm, Q, attached to the sleeve of said governor, acts to gradually throw the resistance R' into the main line as the speed increases and to remove it as the speed diminishes.

With all these forms, an adjustable resistance, $R^2$, (shown in Fig. 1,) should be placed in the field-circuit of the generator to regulate the generation of current according to variations in the number of translating devices in circuit, or other suitable form of regulating device should be provided for this purpose.

What I claim is—

1. The combination, with a gas-engine, a dynamo or magneto electric machine driven thereby, and one or more translating devices supplied with current by said machine, of means for compensating for irregularities in the speed of said engine, whereby a practically constant electro-motive force will be maintained at the translating device or devices, substantially as set forth.

2. The combination, with a gas-engine, a dynamo or magneto electric machine driven thereby, and translating devices supplied with current by said machine, of means for controlling the supply of current to said translating devices to compensate for irregularities in the speed of said engine, so as to maintain a practically constant electro-motive force, substantially as set forth.

3. The combination, with a gas-engine, a dynamo or magneto electric machine driven thereby, and translating devices supplied with current by said machine, of means actuated by a moving part of the apparatus controlling the supply of current to the translating devices to compensate for accelerations and retardations in the speed of said engine, substantially as set forth.

4. The combination, with a gas-engine, an electric generator driven thereby, and translating devices supplied by such generator, of means actuated by some moving portion of the apparatus for gradually varying the resistance of the circuit which contains the translating devices to compensate for the gradual accelerations and retardations of the speed of said engine, whereby a practically constant electro-motive force is maintained, substantially as set forth.

5. The combination, with a gas-engine, an electric generator driven thereby, and translating devices supplied by such generator, of a circuit-controlling device operated by the movement of said engine, and controlling a circuit or circuits whose opening or closure varies the resistance of the circuit containing the translating devices, to compensate for irregularities in the speed of said engine, substantially as set forth.

6. The combination, with a gas-engine, an electric generator driven thereby, and translating devices supplied by said generator, of an eccentric mounted on a revolving portion of the apparatus, and a circuit-controlling device operated by said eccentric and controlling the supply of current to the translating devices, to compensate for irregularities in the speed of the engine, substantially as set forth.

7. The combination, with the gas-engine, the generator, and the translating devices, the last being arranged in multiple arc, of means actuated by the movement of the engine for closing other multiple-arc circuits when the speed of the engine increases, and opening such circuits when the speed declines, substantially as set forth.

8. The combination, with the gas-engine, the generator, and translating devices in multiple arc, of a number of multiple-arc circuits of various resistances, and means actuated by the movement of the engine for successively closing such circuits to compensate for irregularities in speed of the engine, substantially as set forth.

9. The combination, with the circuit-controlling arm carried by the eccentric operated from the shaft of the gas-engine, and the contacts made successively by said arm, of means for keeping said arm from touching said contacts during the revolutions of the shaft in which no explosions occur, substantially as set forth.

10. The combination, with the arm operated by the eccentric and carrying a contact-point which slides on the edges of thin commutator-plates, of means for keeping said point from contact with said plates during one-half of the movement of the eccentric, substantially as set forth.

11. The combination, with the eccentric-operated arm provided with a contact-point and the edgewise commutator-plates, of the spring-plate, over which said contact-point passes in one direction, but under it in the other, substantially as set forth.

12. The combination, with a gas-engine, a dynamo or magneto electric machine driven thereby, and translating devices supplied with current by said machine, of adjustable means for compensating for irregularities in the speed of said engine, whereby a practically constant electro-motive force will be maintained at the translating devices, substantially as set forth.

13. The method of maintaining a constant electro-motive force at the translating devices in a system of electrical distribution whose generator is actuated by an intermittently-operating motor, consisting in varying the proportion of the entire current generated, which is supplied to said translating devices to a degree corresponding to the curve of acceleration and retardation of the speed of said motor, the proportion of current sent to the translating devices being diminished when the speed increases, and vice versa, substantially as set forth.

This specification signed and witnessed this 20th day of December, 1882.

THOS. A. EDISON.

Witnesses:
H. W. SEELY,
WM. H. MEADOWCROFT.